(12) United States Patent
Novacek

(10) Patent No.: US 6,769,249 B2
(45) Date of Patent: Aug. 3, 2004

(54) LOW SLIP STEERING SYSTEM AND IMPROVED FLUID CONTROLLER THEREFOR

(75) Inventor: William J. Novacek, Bloomington, MN (US)

(73) Assignee: Eaton Corporation, Cleveland, OH (US)

( * ) Notice: Subject to any disclaimer, the term of this patent is extended or adjusted under 35 U.S.C. 154(b) by 135 days.

(21) Appl. No.: 10/278,953

(22) Filed: Oct. 23, 2002

(65) Prior Publication Data

US 2003/0037827 A1 Feb. 27, 2003

Related U.S. Application Data

(63) Continuation-in-part of application No. 09/870,024, filed on May 30, 2001, now abandoned.

(51) Int. Cl.[7] .................................................. F15B 9/10
(52) U.S. Cl. ...................... 60/384; 60/494; 137/625.24
(58) Field of Search ...................... 137/625.22, 625.24; 60/384, 385, 387, 494

(56) References Cited

U.S. PATENT DOCUMENTS

| | | | | |
|---|---|---|---|---|
| 4,558,720 A | * | 12/1985 | Larson et al. | 60/384 |
| 4,663,936 A | * | 5/1987 | Morgan | 60/494 |
| 4,781,219 A | * | 11/1988 | Haarstad et al. | 137/625.24 |
| 4,827,978 A | * | 5/1989 | Novacek | 60/384 |
| 4,862,690 A | * | 9/1989 | Haarstad | 60/384 |
| 5,136,844 A | * | 8/1992 | Stephenson et al. | 60/384 |
| 5,638,864 A | * | 6/1997 | Haarstad et al. | 137/625.24 |

* cited by examiner

*Primary Examiner*—John Rivell
(74) *Attorney, Agent, or Firm*—L. J. Kasper

(57) ABSTRACT

A fluid controller (27) for use with a fluid pressure operated device (45) having an inlet (47) and an outlet (49) and defining a fluid leakage path therebetween. The controller (27) includes valving (61) defining a main fluid path and further defines a fluid bleed passage including a variable bleed orifice ($A_B$), having a substantially zero flow area when the controller valving (61) is in its neutral position (N) and in the normal operating position (R), but beginning to open as the valving approaches its maximum displacement position (R-M).

12 Claims, 6 Drawing Sheets

LOW SLIP STEERING SYSTEM AND IMPROVED FLUID CONTROLLER THEREFOR

CROSS-REFERENCE TO RELATED APPLICATIONS

This application is a continuation-in-part (CIP) of application U.S. Ser. No. 09/870,024, filed May 30, 2001, now abandoned, in the name of William J. Novacek for a "LOW SLIP STEERING SYSTEM AND IMPROVED FLUID CONTROLLER THEREFOR".

BACKGROUND OF THE DISCLOSURE

The present invention relates to fluid controllers for use in vehicle hydrostatic power steering systems, and more particularly, to such controllers which are to be used with fluid pressure operated steering actuators of the type which are likely to have noticeable leakage, from the inlet port to the outlet port of the actuator.

Although the present invention may be utilized in a hydrostatic power steering system in which the steering actuator is a linear cylinder (either single or double rod end), it is especially advantageous when utilized in a system in which the steering actuator is a rotary motor, and will be described in connection therewith. Examples of rotary motors which could be utilized as the steering actuator would be a gear motor, or a vane motor, or possibly a gerotor motor of the fixed axis type. Those skilled in the art will understand that the invention is especially advantageous when used with such a motor as the steering actuator for reasons which will become apparent subsequently.

In a typical hydrostatic power steering system, the steering actuator defines an inlet and an outlet which are connected to the control fluid ports of a fluid controller, which is also typically referred to as a steering control unit (SCU). The steering actuator receives at its inlet a flow of metered, pressurized fluid from the SCU, which results in an output motion which, in turn, results in appropriate movement of the steered wheels.

If the steering actuator is a rotary motor, there is likely to be the potential for a noticeable amount of internal leakage between the inlet and the outlet, effectively bypassing the rotating group. The amount of leakage which can or does occur during normal steering operations does not represent a significant problem in terms of the overall performance of the steering system.

However, it has been found that there may be a performance problem whenever one of the steered wheels of the vehicle engages an object, such as a curb, or for some other reason, the system is effectively steering "against-the-stops". Whenever a steer against-the-stops type of situation occurs, such that there is no rotary output from the rotating group of the motor, a substantial amount of the fluid communicated to the inlet of the motor will leak internally within the motor, bypassing the rotating group, and flowing to the outlet port.

One result of such internal leakage within the steering actuator is that the SCU continues to communicate metered, pressurized fluid to the inlet of the actuator. Thus, even though no additional turning motion is being transmitted to the steered wheels, the operator is still able to rotate the steering wheel. Such ongoing ability to rotate the steering wheel, without any corresponding change in the position of the steered wheels, appears to the vehicle operator as steering wheel "slip" which is considered a very undesirable characteristic of a steering system. Typically, vehicle manufacturers specify a maximum, permissible steering wheel slip, generally in terms of the maximum permissible number of rotations of the steering wheel over a given time period. For example, a typical specification for wheel slip would be somewhere in the range of about two to about five revolutions per minute, as a maximum, permissible amount of slip.

As is well know to those skilled in the art of fluid controllers, a typical fluid controller of the type to which the present invention relates includes some sort of controller valving defining a neutral position (when there is no steering input), a normal operating position (when normal steering is occurring) and a maximum displacement position, i.e., the maximum opening (flow area) of the valving. Whenever the steering system is in a steer against-the-stops type of situation, the controller valving is typically displaced to the maximum displacement condition. The conventional neutral return spring, which is present in most such fluid controllers, tends to return the valving toward the neutral position, but is at its fully deflected condition when the valving is in the maximum displacement condition.

Fluid controllers of the type which can utilize the present invention typically include some sort of fluid actuated arrangement for imparting follow-up movement to the controller valving, tending to return the valving from its normal operating position toward its neutral position. In the fluid controllers produced and sold by the assignee of the present invention, the fluid actuated arrangement is a fluid meter which comprises a gerotor gear set. The gerotor gear set includes an internally toothed ring and an externally toothed star, disposed eccentrically within the ring. One possible solution to the apparent slip problem discussed above is to increase the tip clearance of the teeth in the gerotor gear set, thus communicating some flow through the fluid meter to the control fluid port, to compensate for the leakage within the actuator. Unfortunately, such an increase in the tip clearance within the gerotor gear set has been found to permit a condition known as "feed-through" in which there is a flow of fluid through the fluid meter even at times when such is not desired.

BRIEF SUMMARY OF THE INVENTION

Accordingly, it is an object of the present invention to provide an improved hydrostatic power steering system of the type described above which overcomes, in the situation described, the apparent wheel slip of the fluid controller.

It is a more specific object of the present invention to provide an improved fluid controller for use in such a system in which the fluid controller is able effectively to compensate for the leakage which is occurring at the steering actuator.

The above and other objects of the invention are accomplished by the provision of a fluid controller operable to control the flow of fluid from a source of pressurized fluid to a fluid pressure operated device having an inlet and an outlet and defining a fluid leakage path therebetween. The fluid controller is of the type including a housing defining an inlet port for connection to the source of pressurized fluid, a return port for connection to a system reservoir, and a control port for connection to the inlet of the fluid pressure operated device. The controller includes valving disposed in the housing and defining a neutral position, a normal operating position, and a maximum displacement position. The housing and the valving cooperate to define a main fluid path providing fluid communication between the inlet port and the control port when the valving is in the normal operating position. The controller includes a fluid actuated means for imparting follow up movement to the valving, tending to return the valving from its normal operating position toward the neutral position, the follow up movement being proportional to the volume of fluid flow through the main fluid path.

The improved fluid controller is characterized by the valving defining a fluid bleed passage having an upstream portion in fluid communication with the main fluid path at a location upstream of the fluid actuated means, and a downstream portion in fluid communication with the main fluid path downstream of the fluid actuated means. The fluid bleed passage includes a variable bleed orifice having a substantially zero flow area when the valving is in the neutral position and in the normal operating position. The variable bleed orifice begins to open as the valving approaches the maximum displacement position.

Therefore, in accordance with the present invention, whenever the steering system is in a steer against-the-stops situation, and the valving is in the maximum displacement position, a small amount of fluid is communicated through the fluid bleed passage of the fluid controller to compensate for the amount of leakage anticipated through the steering actuator.

DETAILED DESCRIPTION OF THE PREFERRED EMBODIMENT

Figure 1:
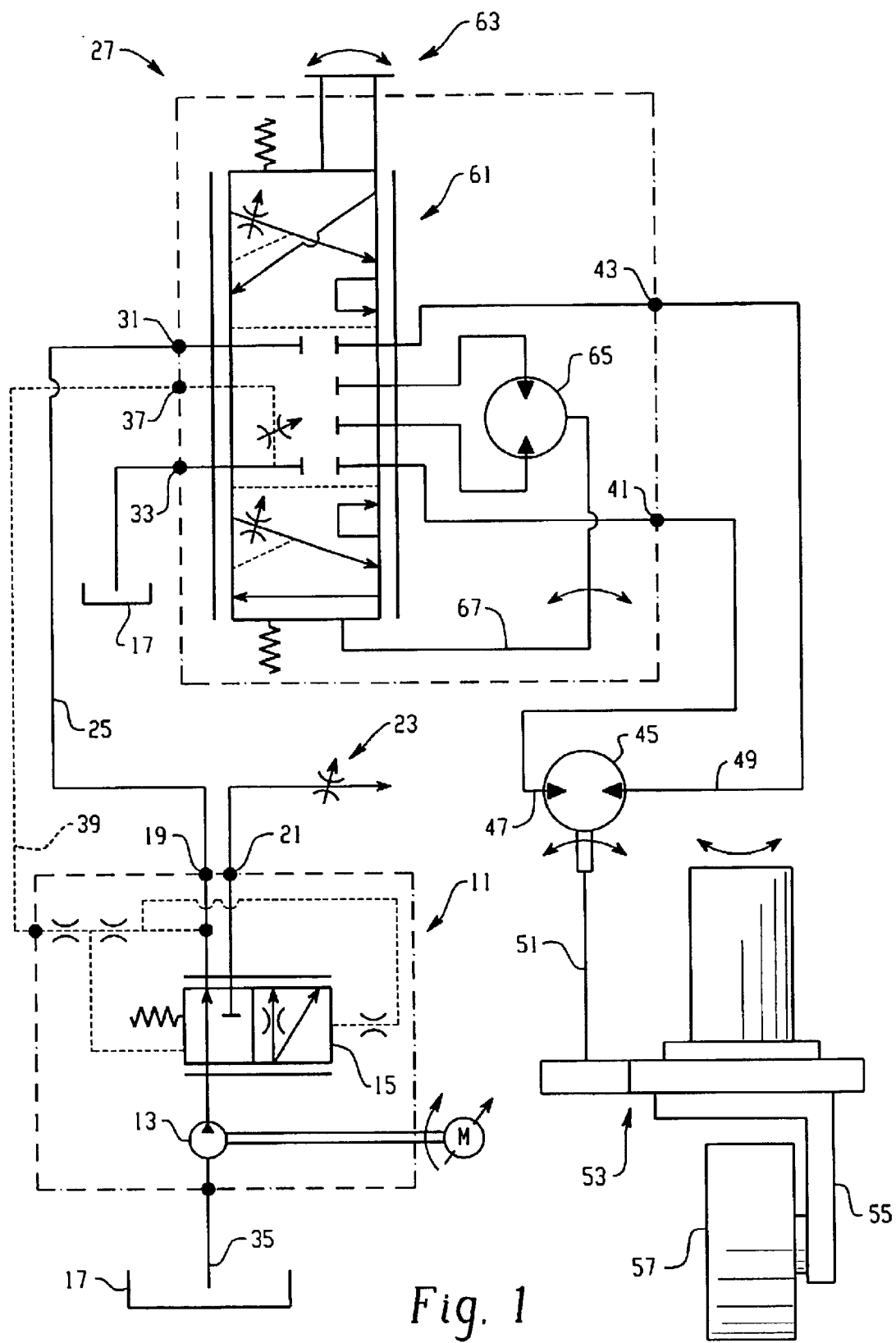
FIG. 1 is a hydraulic schematic of a hydrostatic power steering system including a fluid controller of the type which may utilize the present invention.

Referring now to the drawings, which are not intended to limit the invention, FIG. 1 is a hydraulic schematic of a vehicle hydrostatic power steering system including a fluid controller of the type to which the present invention applies. The system includes a source of pressurized fluid, generally designated 11, which in the subject embodiment, and by way of example only, includes a fluid pump 13 and a load sensing priority type flow control valve 15. The fluid pump 13 is shown herein as a fixed displacement pump for ease of illustration, having its inlet connected to a system reservoir 17.

As is well know to those skilled in the art, because of the presence of the priority valve 15, the source 11 includes a pair of fluid outlets including a priority outlet 19 and an excess flow outlet 21. For simplicity, the excess flow outlet 21 is shown connected to an auxiliary load circuit, represented schematically by a variable orifice 23. The priority outlet 19 is connected by means of a conduit 25 to a fluid controller, generally designated 27. It should be noted that the reference numeral "27" will be used throughout in reference to the fluid controller, even though the schematic representation in FIG. 1 and the axial cross-section in FIG. 3 do not actually illustrate the present invention.

Referring still primarily to FIG. 1, the fluid controller 27 includes a housing 29 (see FIG. 3) which defines an inlet port 31, to which is connected the conduit 25. The housing 29 also defines a return port 33 which is connected to the system reservoir 17 by means of a conduit 35. The housing 29 further defines a load signal port 37 (shown only in FIG. 1) from which a load signal 39 is communicated to the priority valve 15 in a manner well know to those skilled in the art.

The housing 29 of the fluid controller 27 also defines a pair of control (motor) fluid ports 41 and 43 which are connected to the opposite ports of a steering actuator, shown herein as comprising a rotary fluid pressure operated motor 45. Assuming a right turn, the control port 41 is connected to a motor inlet 47 while a motor outlet 49 is connected to the other control port 43. The output of the rotary motor 45 is shown schematically in FIG. 1 as a shaft 51 which transmits torque (steering output motion) to a gear train, generally designated 53, by means of which the rotation of the shaft 51 is transmitted into a higher torque rotation of a steered wheel support structure 55. Attached rotatably to the support structure 55, and driven thereby, is a steered wheel 57, it being understood that, in a typical vehicle installation, there would be two of the steered wheels 57, such that the structure associated with the steered wheel 57, and shown in FIG. 1, would be duplicated. In some vehicle applications, there may be as many as four steered wheels, and the present invention is equally adaptable to such applications.

Figure 2:
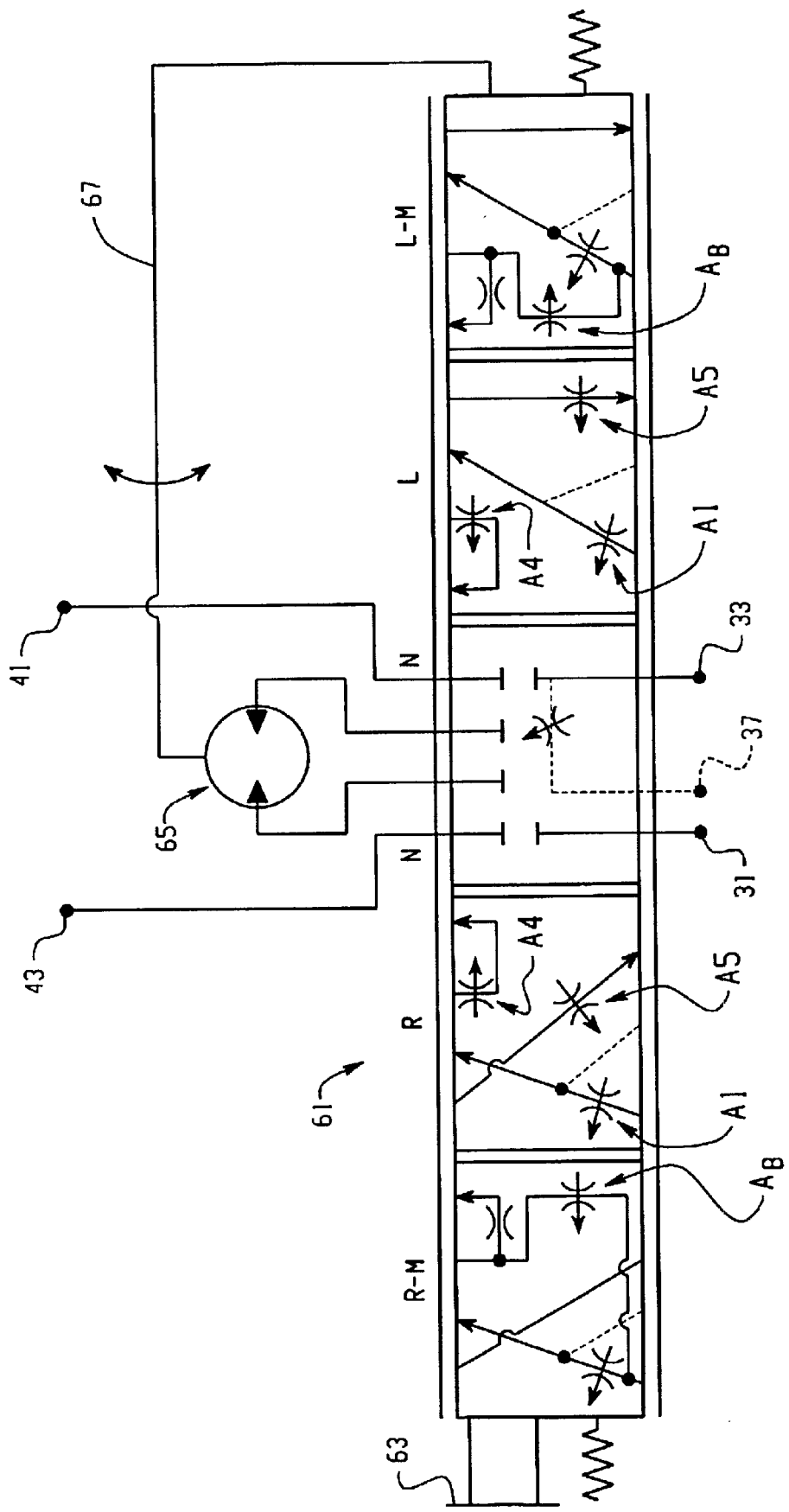
FIG. 2 is a greatly enlarged hydraulic schematic of the fluid controller of the present invention.

Referring now to FIG. 2, in conjunction with FIG. 1, it may be seen that the fluid controller 27 includes controller valving, generally designated 61, a general function of which is to control the flow of fluid from the inlet port 31 to the control port 41 (assuming a right turn), and at the same time, control the flow of returning fluid from the opposite control port 43 to the return port 33. Such control of fluid flow within the fluid controller 27 is accomplished in response to rotation by the vehicle operator of a steering wheel, represented schematically in FIGS. 1 and 2 as an input 63.

The fluid controller 27 may be of the general type illustrated and described in U.S. Pat. No. 5,638,864, assigned to the assignee of the present invention and incorporated herein by reference. More specifically, the fluid controller 27 includes controller valving 61 which is moveable from its neutral position ("N" in FIG. 2) to either a right turn position ("R" in FIG. 2) or a left turn position ("L" in FIG. 2). Those skilled in the art will understand that the normal operating positions of the controller valving 61 are those positions disposed immediately on either side of the neutral position N, in FIG. 2. When the valving 61 is in either of the turn positions (R or L), the pressurized fluid flowing through the valving 61 also flows through a fluid meter 65, one function of which is to measure (meter) the proper amount of fluid to be communicated to the appropriate control port 41 or 43. As is well know to those skilled in the art, the other function of the fluid meter 65 is to provide follow-up movement to the valving 61, such that the valving is returned to its neutral position N after the desired amount of fluid has been communicated to the steering actuator. As is shown in FIGS. 1 and 2, such follow-up movement is achieved by means of a mechanical follow-up connection, from the fluid meter 65 to the valving 61, the mechanical follow-up connection being shown schematically at 67.

As is also shown schematically in FIGS. 1 and 2, the controller valving 61 defines a plurality of variable orifices whenever the valving is moved from its neutral position N to one of its normal operating positions R or L. These variable orifices will be described in greater detail subsequently, in conjunction with the detailed description of FIGS. 6 through 8. Also shown schematically in FIG. 2 are two additional positions of the valving 61 which are not shown in FIG. 1, and which illustrate one aspect of the present invention. Adjacent the normal operating position in the right turn R is the right turn maximum displacement condition ("R-M") and similarly, adjacent the normal operating position in the left turn L is the left turn maximum displacement position ("L-M"). These positions of the valving will also be described in greater detail, in connection with the description of FIG. 8.

Fluid Controller 27

Figure 3:
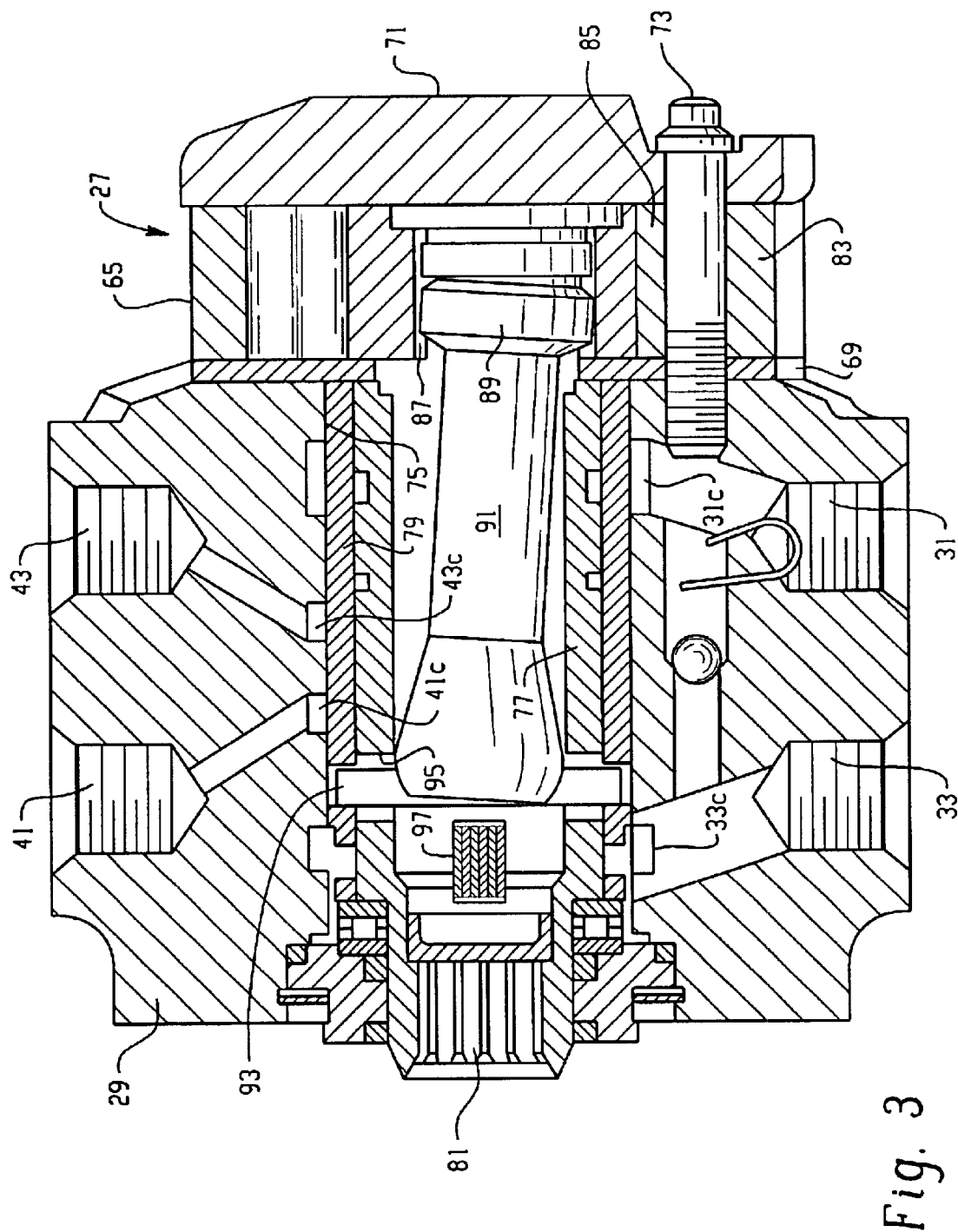
FIG. 3 is an axial cross-section of a fluid controller of the type to which the present invention relates.

Referring now primarily to FIG. 3, the construction of the fluid controller 27 will be described in some detail. The controller comprises several sections including the housing section 29, a port plate 69, a section comprising the fluid meter 65, and an end cap 71. These sections are held together in tight, sealing engagement by means of a plurality of bolts 73, only one of which is shown in FIG. 3, and which are in threaded engagement with the housing 29. The housing 29 defines the inlet port 31, the return port 33, and the control ports 41 and 43. The housing 29 also defines the load signal port 37 which is not shown in FIG. 3.

Rotatably disposed within a valve bore 75 defined by the housing 29 is the valving arrangement 61. In the subject embodiment, and by way of example only, the valving 61 comprises a primary, rotatable valve member 77 (hereinafter also the "spool"), and a cooperating, relatively rotatable follow-up valve member 79 (hereinafter also the "sleeve"). At the forward end of the spool 77 is a portion having a reduced diameter and defining a set of internal splines 81 which provide for a direct mechanical connection between the spool 77 and the steering wheel 63. The spool 77 and sleeve 79 will be described in greater detail subsequently.

The fluid meter 65 may be of a type well known in the art and includes herein, and by way of example only, an internally toothed ring 83, and an externally toothed star 85. The star 85 defines a set of internal splines 87, and in splined engagement therewith is a set of external splines 89, formed at the rearward end of a main drive shaft 91. The shaft 91 has a bifurcated forward end permitting driving connection between the shaft 91 and the sleeve 77, by means of a pin 93 passing through a pair of pin openings 95 in the spool 77. Thus, pressurized fluid flowing through the valving 61, in response to rotation of the steering wheel 63 and the spool 77 flows through the fluid meter 65, causing orbital and rotational movement of the star 85 within the ring 83. Such movement of the star 85 causes follow-up movement of the sleeve 79, by means of the drive shaft 91 and pin 93 (which together comprise the follow-up connection 67 of FIGS. 1 and 2). This movement of the star 85 maintains a particular relative displacement between the spool 77 and sleeve 79, for a given, constant rate of rotation of the steering wheel.

A plurality of leaf springs 97 extends through an opening in the sleeve 79, biasing the sleeve 79 toward its neutral position relative to the spool 77, in a manner which is conventional and well known in the art.

It may be seen in FIG. 3 that the housing 29 defines four annular chambers surrounding the sleeve 79, to provide fluid communication between the outer surface of the sleeve 79 and the various ports 31, 33, 41 and 43. The various annular chambers are designated by the reference numeral of the respective port, accompanied by the letter "c". Those skilled in the art will understand the interaction of the annular chambers 31c, 33c, 41c and 43c with the valving 61.

The toothed interaction of the star 85, orbiting and rotating within the ring 83, defines a plurality of expanding and contracting fluid volume chambers, and adjacent each chamber, the port plate 69 defines a fluid port (not shown in FIG. 3) and adjacent thereto, the housing 29 provides a plurality of axial bores (also not shown in FIG. 3), each of which is in open communication at one end with the fluid ports in the port plate 69, and at its other end, with the valve bore 75.

Valving Arrangement 61

Figure 4:
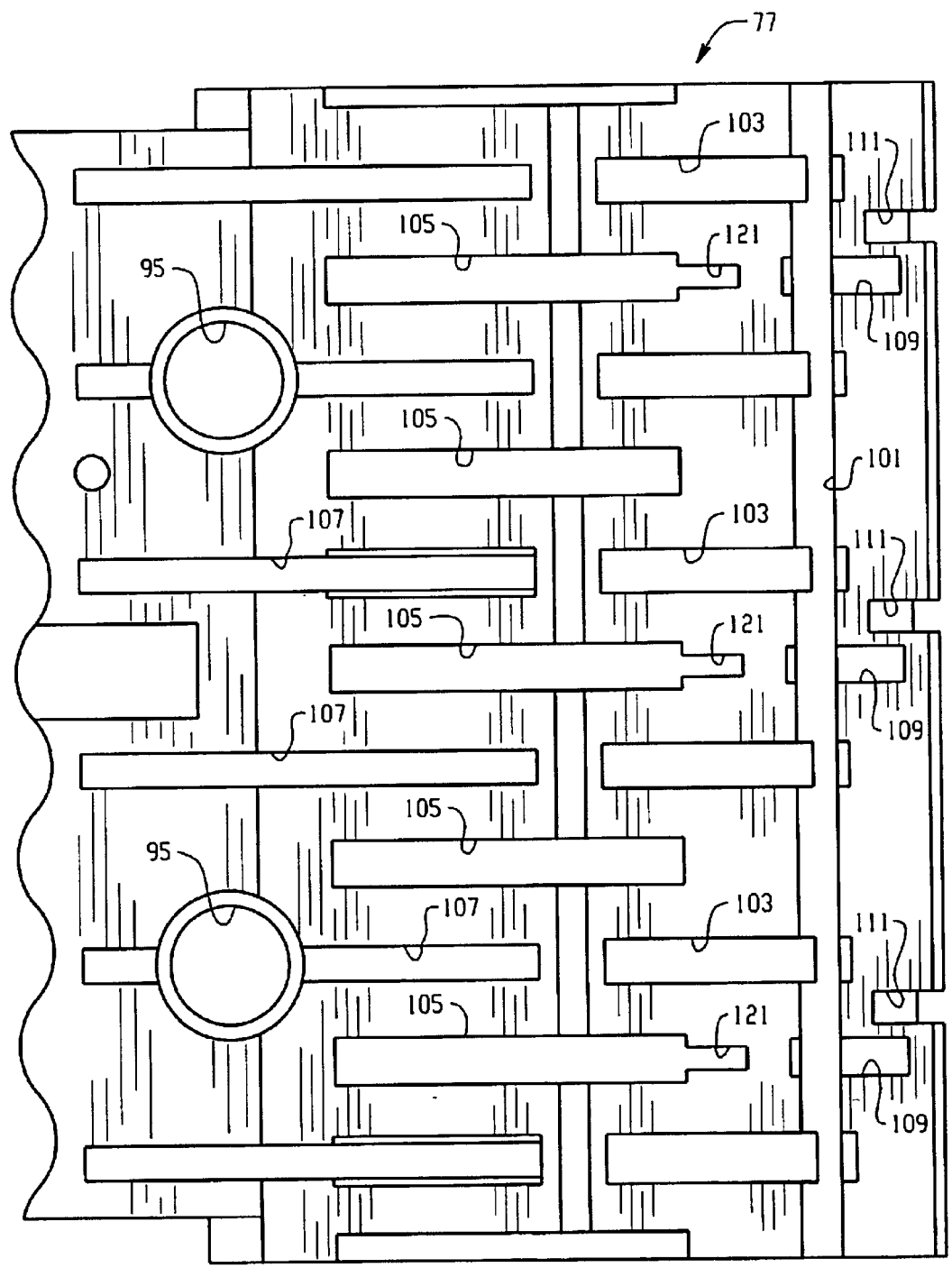
FIG. 4 is a flat view of the spool valve of the fluid controller shown schematically in FIG. 2, including the present invention.
Figure 5:
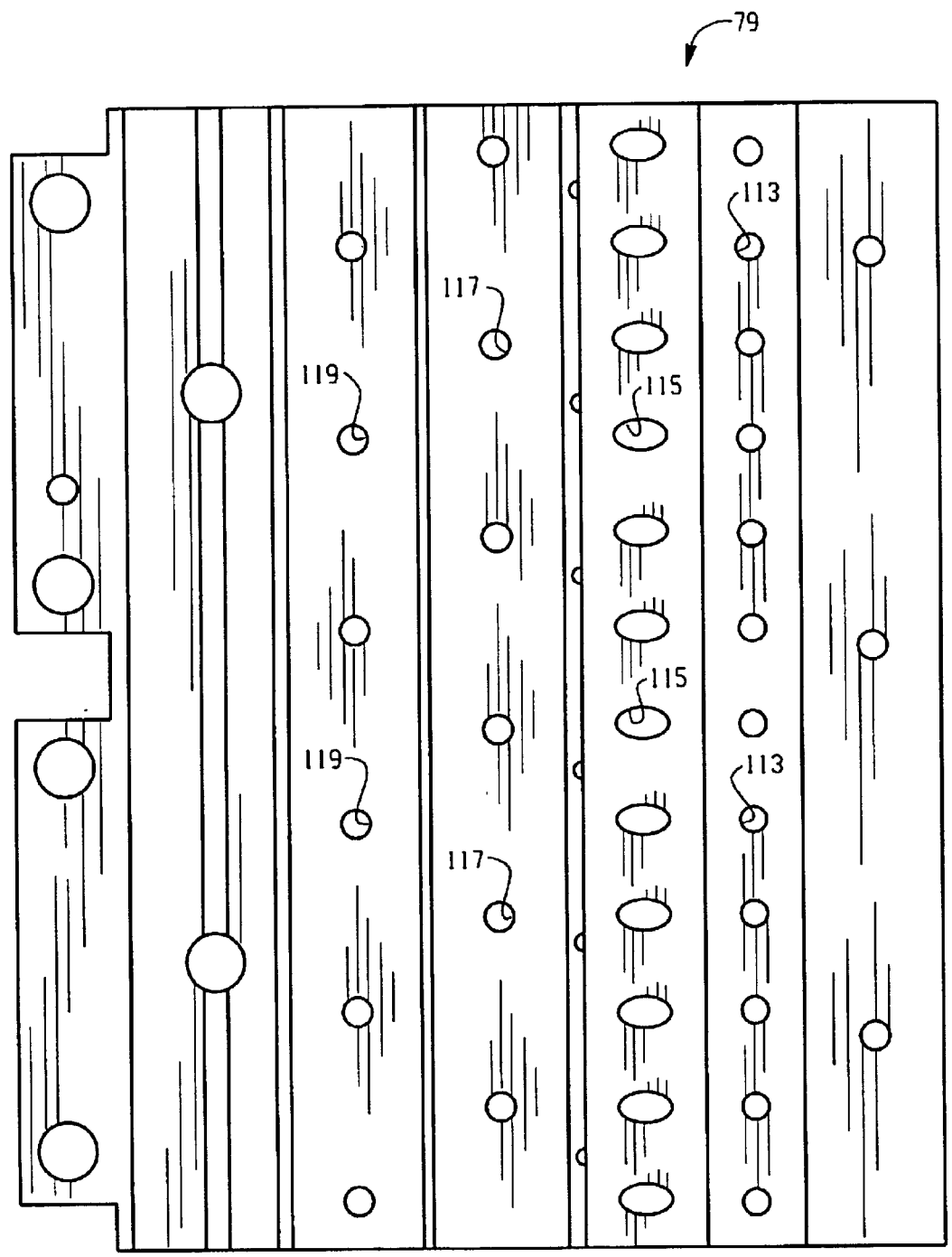
FIG. 5 is a flat view of the sleeve valve of the fluid controller shown schematically in FIG. 2, for use as part of the present invention

Referring now primarily to FIGS. 4 and 5, the spool 77 and the sleeve 79 will be described in greater detail. It should be noted that FIG. 4 illustrates the outer surface of the spool 77, while FIG. 5 illustrates both the outer surface of the sleeve 79 and several features which are disposed on the inner surface of the sleeve 79, and therefore, are in a valving relationship with the features disposed on the outer surface of the spool 77. It should be understood by those skilled in the art that both the spool 77 and the sleeve 79 include a number of features or elements which are conventional, but are not directly involved in the operation of the invention, and therefore, do not bear reference numerals in FIGS. 4 and 5, are not described hereinafter.

The spool 77 defines an annular groove 101, and in communication therewith, a plurality of axial slots 103. Circumferentially displaced from each of the axial slots 103 is a longer axial slot 105, and circumferentially aligned with each of the axial slots 103 is an even longer axial slot 107, the function of which will be described subsequently. To the right of the annular groove 101, the spool 77 defines a plurality of axial, open-center slots 109, each of which has, adjacent thereto, a slot 111 which is in open communication, toward its right end, with the interior of the spool 77.

The sleeve 79 defines a plurality of pressure ports 113, in communication with the annular chamber 31c and therefore, the pressure ports 113 receive pressurized, un-metered fluid from the source 11. To the left of the ports 113 is a plurality of meter ports 115, which communicate between the valving arrangement 61 and the expanding and contracting fluid volume chambers of the fluid meter 65, through the axial bores defined by the housing 29, in a manner well know to those skilled in the art. In the subject embodiment, and by way example only, the star 85 has six external teeth and the ring 83 has seven internal teeth, so there are 12 of the meter ports 115. Disposed to the left of the meter ports 115 is a plurality of cylinder ports 117, in communication with the annular chamber 41c, and further to the left, a plurality of cylinder ports 119, in communication with the annular chamber 43c.

Operation Of Valving 61

It is believed that the basic operation of the controller 27 and the valving 61 described thus far, all of which is conventional, should be readily apparent in view of the teachings of the above incorporated patent. However, the operation of the valving 61 will be described briefly, partially to relate the structure illustrated in FIGS. 3–8 with the schematics of FIGS. 1 and 2. The operation of the valving 61 will be described in connection with FIGS. 6–8, which are enlarged (relative to FIGS. 4 and 5), and are fragmentary overlay views of the spool 77 (except where visible through an opening in the sleeve 79) and the sleeve 79 (but showing only those features present on the inside surface of the sleeve).

Figure 6:
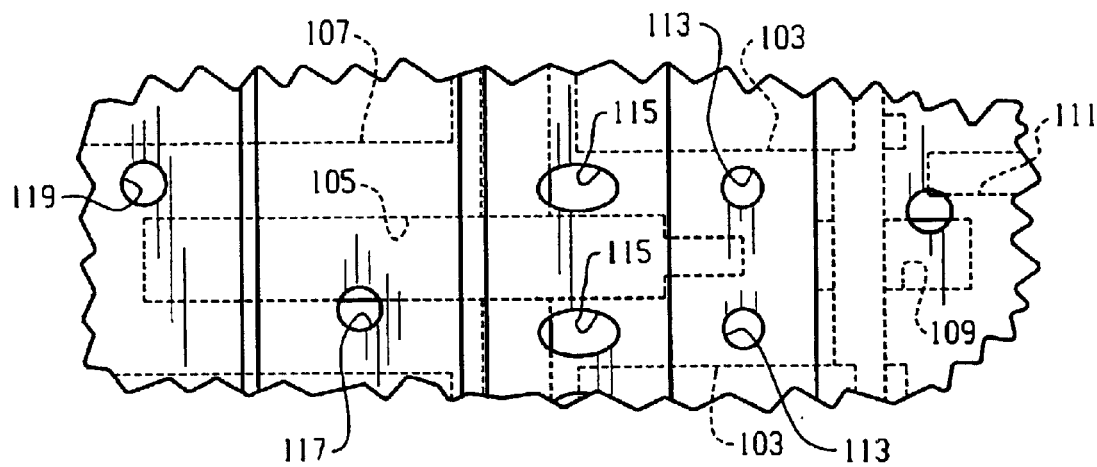
FIG. 6 is an enlarged, fragmentary overlay view of the valving shown in FIGS. 4 and 5, and with the valving in its neutral position.

Referring now primarily to FIG. 6, when the valving 61 is in the neutral position N (no rotation of the steering wheel occurring), inlet fluid is communicated from the inlet port 31 into the annular chamber 31c. The pressure ports 113 are in open communication with the annular chamber 31c, but there is no flow through the pressure port 113, because, in the neutral position shown in FIG. 6, the ports 113 are blocked from communication with any of the slots or grooves defined by the spool 77, i.e., the ports 113 are blocked by the outer cylindrical surface of the spool 77.

Figure 7:
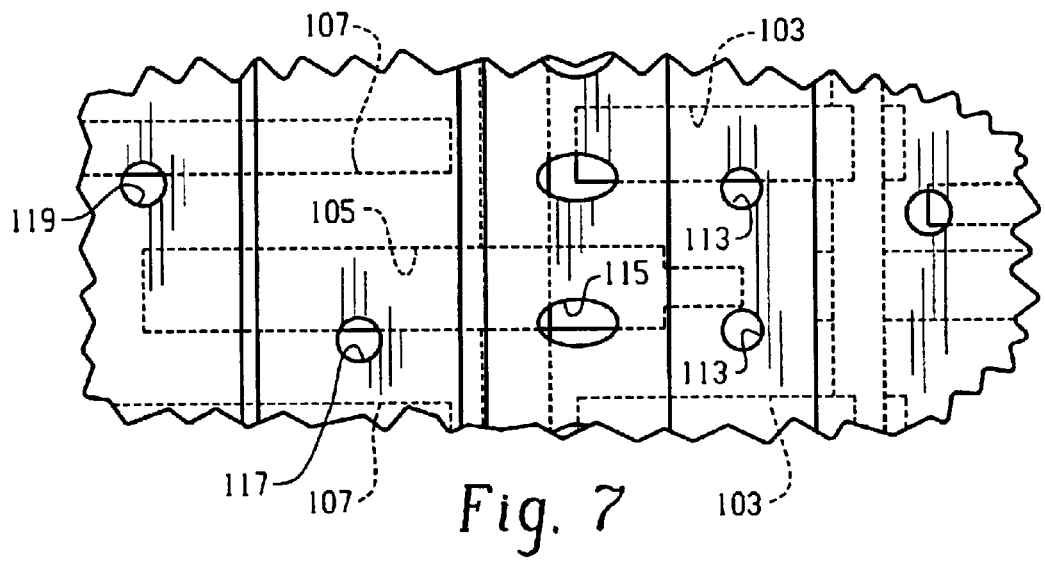
FIG. 7 is an enlarged, fragmentary overlay view of the valving, similar to FIG. 6, but with the valving in its normal operating position, in a right turn.

Referring now primarily to FIG. 7, when the steering wheel is rotated clockwise by the operator (a right turn condition), the spool 77 is displaced from its neutral position, relative to the sleeve 79. Within each pair of pressure ports 113, one of the ports 113 begins to approach, and then overlap one of the axial slots 103, while the other port 113 moves away from its respective axial slot 103. The areas of overlap of the pressure ports 113 and the axial slots 103 define a variable flow control orifice, the composite of these individual variable orifices comprising a main variable flow control orifice A1 (see FIG. 2). At the same time, each of the axial slots 103 begins to communicate with one of the meter ports 115, the area of overlap therebetween defining a variable orifice, and the composite of these comprising a variable flow control orifice A2, as is well known to those skilled in the art and is not shown in the schematics of FIGS. 1 and 2. Every other meter port 115 is in communication with one of axial slots 103, while the alternate meter ports 115 are now in communication with the longer axial slots 105. The area of overlap between each of these alternate meter ports 115 and the respective axial slots 105 defines a variable orifice, and the composite of these comprises a variable flow control orifice A3, also not shown in the schematics of FIGS. 1 and 2. As is well known to those skilled in the art, the fluid which flows through the A2 orifice, and from there to the expanding volume chambers of the fluid meter 65 is pressurized, un-metered fluid, while the fluid which flows from the contracting volume chambers of the fluid meter 65 through the A3 orifice is pressured, metered fluid.

With the spool 77 and the sleeve 79 in the relative position shown in FIG. 7, i.e., in the normal operating position R, each of the longer axial slots 105 begins to communicate with an adjacent one of the cylinder ports 117, the overlap therebetween defining a variable orifice, and the composite of these individual orifices comprising a variable flow control orifice A4. As is well known to those skilled in the art, the cylinder ports 117 are in communication, by means of the annular chamber 41c, with the control fluid port 41, and with what is, in a right turn condition, the inlet 47 of the rotary motor 45. Fluid returning from what is now the outlet 49 of the rotary motor 45 enters the control fluid port 43, then flows through the annular chamber 43c, and then through the cylinder ports 119 which are now in fluid communication with the axial slots 107. The overlap of the ports 119 and the axial slots 107 defines a variable orifice, the composite of these individual variable orifices comprising a variable flow control orifice A5. Therefore, the flow path through the variable flow control orifices A1, A2, fluid meter 65, variable flow control orifices A3, A4, fluid motor 45, and variable flow control orifice A5, as just described comprises the "main fluid path" in the right turn condition. It should be noted that the architecture of the valving of some fluid controllers does not require or include the variable flow control orifices A2 and A3 (i.e., those on the inlet and outlet sides, respectively, of the fluid meter 65). Alternatively, in some controller architectures, the A2 and A3 orifices are fixed orifices, rather than variable. All that is required for the present invention is to have one flow control orifice (e.g., the A1 orifice) between the inlet port 31 and the fluid meter 65, and one more flow control orifice (e.g., A4) between the fluid meter 65 and the control (motor) fluid port 41 or 43.

Figure 8:
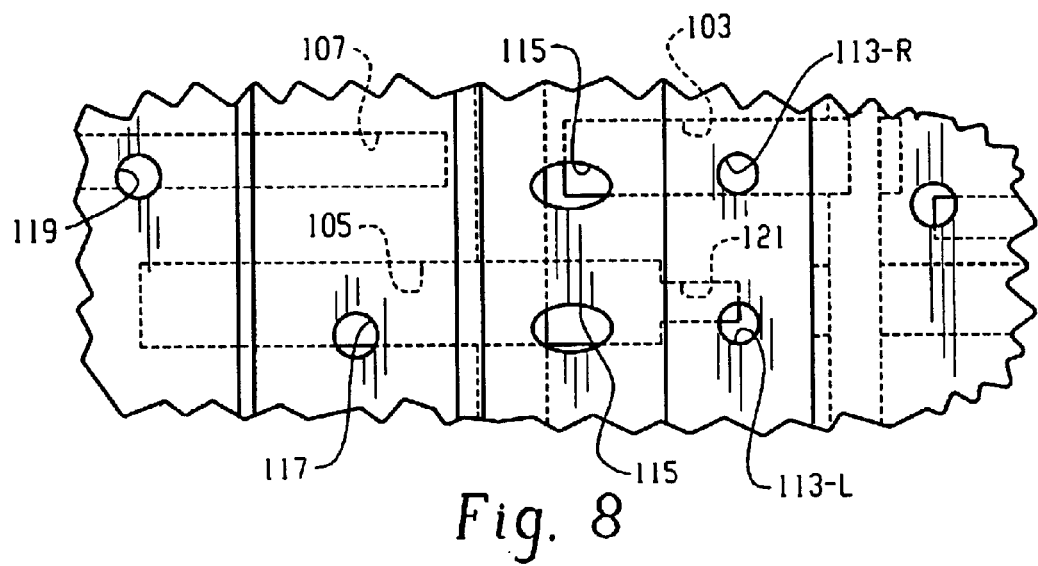
FIG. 8 is an enlarged, fragmentary overlay view of the valving shown in FIG. 6, but with the valving in its maximum displacement position, and still in a right turn, and illustrating the operation of the present invention

Referring now primarily to FIG. 8, in conjunction with FIG. 4, of the six longer axial slots 105, at least one is provided with an axially extending recess 121, and in the subject embodiment, and by way of example only, there are three of the recess 121 (see FIG. 4). In the subject embodiment, and again by way of example only, valving 61 has a maximum deflection (displacement) of about 10 degrees. Therefore, as the valving 61 approaches the maximum displacement position (R-M in FIG. 2), i.e., when the relative displacement of the spool and sleeve is anywhere from about 6 or 7 degrees to about 9 degrees (the position shown in FIG. 8) the various flow control orifices A1 through A5 have reached, or nearly reached, their maximum flow area. For ease of further illustration and description, the pressure ports are labeled 113-R and 113-L. The pressure port 113-R is the one which overlaps the axial slot 103 to define the A1 orifice in a right turn condition, while the pressure port 113-L is one the which moves away from its respective axial slot 103, but would overlap its respective axial slot 103 to form the A1 orifice in a left turn condition.

As is seen in FIG. 8, as the relative position of the spool 77 and the sleeve 79 approaches the maximum displacement position (R-M in FIG. 2), the pressure port 113-L begins to overlap the respective axially extending recess 121, the area of overlap therebetween defining a variable orifice, and the composite of the three overlaps (because there are three of the recesses 121) comprises a variable bleed orifice $A_B$. Therefore, at the three locations on the spool 77 wherein the axial slot 105 includes one of the axially extending recesses 121, communication of pressurized un-metered fluid through the pressure port 113, and then through the recess 121 and into the axial slot 105 comprises a fluid bleed, and those three locations cumulatively comprise a fluid bleed passage. As is best shown schematically in FIG. 2, the fluid bleed passage, including the variable bleed orifice $A_B$, has an upstream portion in communication with the main fluid path at a location shown in FIG. 2 as being upstream of the first variable fluid control orifice A1, although it should be understood that, within the scope of the present invention, the point of communication could, alternatively, be downstream of the A1 orifice. In addition, the fluid bleed passage has a downstream portion in communication with the main fluid path downstream of the fluid meter 65, but upstream (preferably) of the variable flow control orifice A4. Note that in FIG. 2, in the R-M and L-M positions, the flow control orifice A4 is shown schematically as a fixed orifice, purely for ease of illustration.

In operation, and is well known to those skilled in the art, most of the steering occurs with the valving 61 in the normal operating position, as is represented in FIG. 7, i.e., with the spool 77 displaced relative to the sleeve 79 by a displacement in the range of about 2 degrees to about 8.5 or 9 degrees. Very little steering occurs while the valving is in the maximum displacement position of FIG. 8 in which, with a maximum possible deflection of 10 degrees, the valving is displaced by at least 8.5 or 9 degrees. However, as was described in the BACKGROUND OF THE DISCLOSURE, whenever the steered wheels 57 engage a curb or a rut or some other obstruction, which resists further movement of the steered wheels, or in a steer against-the-stops situation, the torque load exerted by the steered wheels on the rotary motor 45 will result in the valving 61 of fluid controller 27 being displaced to the maximum displacement condition (R-M) illustrated in FIG. 8. As was also described in the BACKGROUND OF THE DISCLOSURE, whenever the steering system is in the condition described above, it is typical for there to be a very noticeable internal leakage path between the inlet and the outlet of the rotary motor 45. However, by means of the present invention, a sufficient quantity of fluid is communicated through the fluid bleed passage, and through the variable bleed orifice $A_B$, and joins the fluid which flows through the main fluid path of the fluid controller 27, this combination of the main path fluid and the bleed fluid together flowing to the control port 43, and from there to the inlet of the rotary motor 45.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A fluid controller operable to control the flow of fluid from a source of pressurized fluid to a fluid pressure operated device having an inlet and an outlet and defining a fluid leakage path therebetween; said fluid controller being of the type including a housing defining an inlet port for connection to the source of pressurized fluid, a return port for connection to a system reservoir, and a control port for connection to said inlet of said fluid pressure operated device, valving disposed in said housing and defining a neutral position, a normal operating position and a maximum displacement position, said housing and said valving cooperating to define a main fluid path providing fluid communication between said inlet port and said control port when said valving is in said normal operating position; fluid actuated means for imparting follow-up movement to said valving, tending to return said valving from said normal operating position toward said neutral position, said follow-up movement being proportional to the volume of fluid flow through said main fluid path, said main fluid path including a first variable flow control orifice, having a minimum flow area when said valving is in said neutral position, and an increasing flow area as said valving is displaced through said normal operating position toward said maximum displacement position; characterized by:

(a) said valving defining a fluid bleed passage having an upstream portion in fluid communication with said main fluid path at a location upstream of said first variable flow control orifice, and a downstream portion in fluid communication with said main fluid path downstream of said fluid actuated means; and (b) said fluid bleed passage including a variable bleed orifice having a substantially zero flow area when said valving is in said neutral position and in said normal operating position, said variable bleed orifice beginning to open as said valving approaches said maximum displacement position.

2. A fluid controller as claimed in claim 1, characterized by said valving comprising a primary, rotatable valve member and a cooperating, relatively rotatable follow-up valve, said primary and follow-up valve members defining said neutral position relative to each other, said fluid controller including a biasing spring operable to bias said primary and follow-up valve members toward said neutral position relative to each other.

3. A fluid controller as claimed in claim 2, characterized by said primary and follow-up valve members being displaceable from said neutral position to said normal operating position relative to each other in opposition to the force of the biasing spring.

4. A fluid controller as claimed in claim 3, characterized by said primary and follow-up valve members being displaceable from said neutral position through said normal operating position to said maximum displacement position, said maximum displacement position corresponding to the maximum possible relative displacement of said primary and follow-up valve members.

5. A fluid controller as claimed in claim 1, characterized by said follow-up valve member defining a first pressure port and a second pressure port both of said pressure ports being in fluid communication with said inlet port when said valving is in said normal operating position, said primary valve member defining a first axial slot, fluid communication between said first pressure port and said first axial slot comprising said first variable flow control orifice.

6. A fluid controller as claimed in claim 5, characterized by said primary valve member defining a second axial slot comprising part of said main fluid path, downstream of said first variable flow control orifice, said second pressure port being out of fluid communication with said second axial slot when said valving is in said normal operating position but being in fluid communication with said second axial slot as said valving approaches said maximum displacement position.

7. A fluid controller operable to control the flow of fluid from a source of pressurized fluid to a fluid pressure operated device having an inlet and an outlet and defining a fluid leakage path therebetween; said fluid controller being of the type including a housing defining an inlet port for connection to the source of pressurized fluid, a return port for connection to a system reservoir, and a control port for connection to said inlet of said fluid pressure operated device, valving disposed in said housing and defining a neutral position, a normal operating position and a maximum displacement position, said housing and said valving cooperating to define a main fluid path providing fluid communication between said inlet port and said control port when said valving is in said normal operating position; fluid actuated means for imparting follow-up movement to said valving, tending to return said valving from said normal operating position toward said neutral position, said follow-up movement being proportional to the volume of fluid flow through said main fluid path characterized by:

(a) said valving defining a fluid bleed passage having an upstream portion in fluid communication with said main fluid path at a location upstream of said fluid actuated means, and a downstream portion in fluid communication with said main fluid path downstream of said fluid actuated means; and (b) said fluid bleed passage including a variable bleed orifice having a substantially zero flow area when said valving is in said neutral position and in said normal operating position, said variable bleed orifice beginning to open as said valving approaches said maximum displacement position.

8. A fluid controller as claimed in claim 7, characterized by said valving comprising a primary, rotatable valve member and a cooperating, relatively rotatable follow-up valve, said primary and follow-up valve members defining said neutral position relative to each other, said fluid controller including a biasing spring operable to bias said primary and follow-up valve members toward said neutral position relative to each other.

9. A fluid controller as claimed in claim 8, characterized by said primary and follow-up valve members being displaceable from said neutral position to said normal operating position relative to each other in opposition to the force of the biasing spring.

10. A fluid controller as claimed in claim 9, characterized by said primary and follow-up valve members being displaceable from said neutral position through said normal operating position to said maximum displacement position, said maximum displacement position corresponding to the maximum possible relative displacement of said primary and follow-up valve members.

11. A fluid controller as claimed in claim 7, characterized by said follow-up valve member defining a first pressure port and a second pressure port both of said pressure ports being in fluid communication with said inlet port when said valving is in said normal operating position, said primary valve member defining a first axial slot, fluid communication between said first pressure port and said first axial slot comprising said first variable flow control orifice.

12. A fluid controller as claimed in claim 11, characterized by said primary valve member defining a second axial slot comprising part of said main fluid path, downstream of said first variable flow control orifice, said second pressure port being out of fluid communication with said second axial slot when said valving is in said normal operating position but being in fluid communication with said second axial slot as said valving approaches said maximum displacement position.

* * * * *